(12) United States Patent
Sugie (10) Patent No.: US 7,609,013 B2
(45) Date of Patent: Oct. 27, 2009

(54) MOTOR DRIVE CIRCUIT AND METHOD (75) Inventor: Hisashi Sugie, Kyoto (JP)

(73) Assignee: Rohm Co., Ltd. (JP)

( * ) Notice: Subject to any disclaimer, the term of this patent is extended or adjusted under 35 U.S.C. 154(b) by 257 days.

(21) Appl. No.: 11/832,181

(22) Filed: Aug. 1, 2007

(65) Prior Publication Data
US 2008/0252240 A1 Oct. 16, 2008

(30) Foreign Application Priority Data
Aug. 1, 2006 (JP) .............................. 2006-209605

(51) Int. Cl.
*H02P 6/06* (2006.01)
(52) U.S. Cl. .............................. 318/400.06; 318/400.35; 318/400.13
(58) Field of Classification Search ............ 318/400.06, 318/400.35, 400.13, 400.17; 360/317; 327/110
See application file for complete search history.

(56) References Cited
U.S. PATENT DOCUMENTS
2008/0157830 A1* 7/2008 Kume .................... 327/110

FOREIGN PATENT DOCUMENTS
| JP | 3-207250 | 9/1991 |
| JP | 10-243685 | 9/1998 |
| JP | 11-75388 | 3/1999 |

* cited by examiner

*Primary Examiner*—Karen Masih
(74) *Attorney, Agent, or Firm*—Cantor Colburn LLP (57) ABSTRACT

A motor drive method which supplies a drive current in a pulse form to a multiphase motor, to drive the motor. The motor drive method includes the steps of: generating a pulse signal having a duty ratio in accordance with torque, alternately repeating an ON time-period and an OFF time-period in accordance with the pulse signal, to supply a drive current in a pulse form to a phase coil currently driving, interpolating back electromotive voltage of the OFF time-period (Toff), using a back electromotive voltage (Vu) of the ON time-period (Ton), with respect to the back electromotive voltage (Vu) occurring in at least one coil of the multiphase motor, to generate an interpolated virtual back electromotive voltage (Vu'), detecting a zero-cross point, by comparing the interpolated virtual back electromotive voltage (Vu') with a midpoint voltage (Vcom) of the coil, to generate a BEMF detection signal (BEMF_EDGE), and switching a phase to be driven, based on the BEMF signal (BEMF_EDGE).

14 Claims, 8 Drawing Sheets

MOTOR DRIVE CIRCUIT AND METHOD

BACKGROUND OF THE INVENTION

1. Field of the Invention

The present invention relates to technology for controlling rotation of a rotor, and in particular, to a motor drive circuit which controls rotation of a motor including a stator having a plurality of coils and a rotor that is magnetic.

2. Description of the Related Art

A brushless direct-current motor is used for rotating a disk in electronic devices using disk-type media, such as portable CD (Compact Disc) devices, DVD (Digital Versatile Disc) devices, and the like. In general, the brushless direct-current (DC) motor is provided with a rotor having a permanent magnet, and a stator having a plurality of phase coils connected in a star configuration; the coils are excited by controlling current supplied to the coils, and the rotor is driven by rotation relative to the stator. The brushless DC motor is generally provided with a sensor such as a Hall element, optical encoder, or the like, in order to detect rotation position of the rotor, and a current supplying each phase coil is switched in accordance with a position detected by the sensor, to give an appropriate torque to the rotor.

In order realize a smaller motor, a sensorless motor has been proposed, which detects rotation position of the rotor without using the sensor, such as the Hall element or the like (for example, refer to Patent Documents 1 to 3). By measuring electrical potential at midpoint wiring of the motor (referred to below as midpoint voltage), for example, the sensorless motor monitors back electromotive voltage (back electromotive force) that occurs in the coils, and by detecting a zero-cross point equal to the midpoint voltage, obtains positional information.

In driving this type of sensorless motor, technology is known by which, using a Pulse Width Modulation (referred to below as PWM) method, current flowing in the phase coils is controlled, torque is adjusted, and control is gently performed to have a sine waveform or arch form.

Patent Document 1: Japanese Patent Application, Laid Open No. H03-207250
Patent Document 2: Japanese Patent Application, Laid Open No. H10-243685
Patent Document 3: Japanese Patent Application, Laid Open No. H11-75388

Figure 1A:
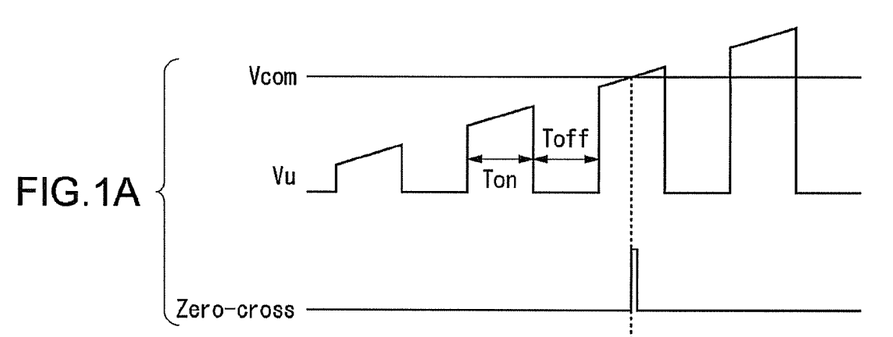
FIGS. 1A and 1B show wave forms of back electromotive voltage in motor driving by a PWM method.
Figure 1B:
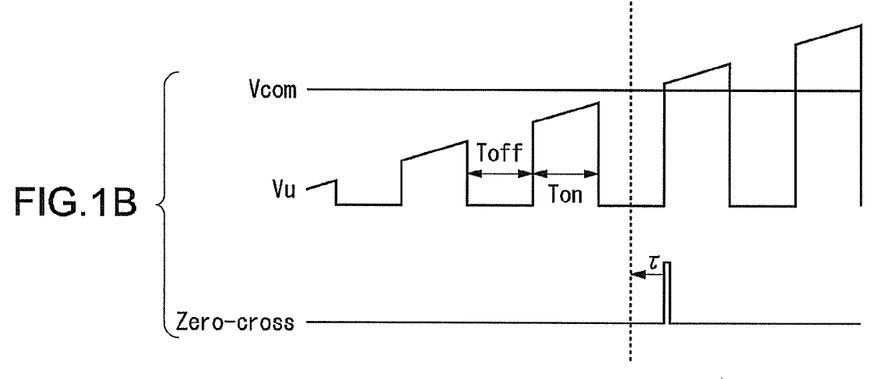

When the PWM method is employed, a drive current flows intermittently in the coils of the motor, according to signal level of a pulse signal. FIGS. 1A and 1B show waveforms of back electromotive voltage in motor driving by the PWM method. FIG. 1A shows a case in which a zero-cross point occurs during an ON time-period Ton, and FIG. 1B shows a case in which the zero-cross point occurs during an OFF time-period Toff. FIG. 1A shows back electromotive voltage Vu and midpoint voltage Vcom that occur in a phase coil during driving, in order from the top. A pulse signal Spwm (not shown in the figure) alternately and repeatedly has a high level and a low level, and, for example, a current flows in a coil during the ON time-period Ton at the high level, and the coil current is interrupted during the OFF time-period Toff at the low level. As a result, when pulse width modulation is carried out, as shown in FIG. 1, the back electromotive voltage Vu that occurs in the phase coil during driving has a voltage level which has meaning only during the ON time-period Ton when the drive current is flowing, and the back electromotive voltage Vu has a voltage close to 0 V, during the OFF time-period Toff when the drive current is not flowing. The back electromotive voltage Vu is compared with the midpoint voltage Vcom by a comparator, and at a point in time when the two voltages intersect, a zero-cross is detected. Therefore, conventionally it has been possible to perform detection of a zero-cross point only during the ON time-period Ton, but there has been a problem in that detection of the zero-cross point could not be performed during the OFF time-period Toff.

That is, if the zero-cross point occurs during the ON time-period Ton, as shown in FIG. 1A, detection is performed immediately at a timing when the zero-cross point occurs. On the other hand, in cases in which the zero-cross point is taken to occur during the OFF time-period Toff, since voltage comparison cannot be performed at that point in time, it has been necessary to wait for the next ON time-period Ton, in order to actually detect the zero-cross point, a time lag $\tau$ occurs, causing rotational irregularity or the like.

SUMMARY OF THE INVENTION

The present invention has been made in light of this situation, and a general purpose thereof is to provide motor drive technology in which detection of a zero-cross point is possible even during OFF time.

According to an embodiment of the present invention, a motor drive circuit is provided which supplies a drive current in a pulse form to a multiphase motor, to drive the motor. The motor drive circuit includes: a pulse signal generation circuit which generates a pulse signal having a duty ratio in accordance with torque; plural switching circuits, provided for every coil of the multiphase motor, which alternately repeat an ON time-period and an OFF time-period to supply a drive current in a pulse form to an end of a connected coil, in accordance with the pulse signal from the pulse signal generation circuit; a BEMF (back electromotive force) detection circuit which compares a back electromotive voltage occurring in at least one coil of the multiphase motor with a midpoint voltage of the coil, to detect a zero-cross point, and which outputs a back electromotive force (BEMF) detection signal; and a switching control circuit which controls drive sequence of the plural switching circuits, based on the BEFM signal from the BEMF detection circuit. The BEMF detection circuit uses, at least, the back electromotive voltage of the ON time-period to interpolate the back electromotive voltage of the OFF time-period, and detects the zero-cross point, based on voltage in accordance with an interpolated virtual back electromotive voltage and the midpoint voltage of the coil.

According to this embodiment, by using the back electromotive voltage of the ON time-period and interpolating the back electromotive voltage of the OFF time-period, to generate the virtual back electromotive voltage, it is possible to perform a comparison of the back electromotive voltage and the midpoint voltage of the coil, even during the OFF time-period, and it is possible to reduce time lag in detecting the zero-cross point.

The BEMF detection circuit may detect slope of the back electromotive voltage, from the back electromotive voltage at a first timing during a certain ON time-period, and the back electromotive voltage at a second timing during another ON time-period, and may use the detected slope to interpolate the back electromotive voltage of an OFF time-period.

Since the slope of the back electromotive voltage maintains an almost constant value, by using the slope of the ON time-period, it is possible to preferably interpolate the back electromotive voltage of the OFF time-period.

The BEMF detection circuit may include a ramp signal generation circuit which detects the slope of the back electromotive voltage, from the back electromotive voltage at the first timing during a certain ON time-period, and the back electromotive voltage at the second timing during another ON time-period, and generates a ramp signal having a period identical to the pulse signal and having a sawtooth waveform that has a slope in accordance with the slope of the detected back electromotive voltage; a difference signal generation circuit which generates a difference signal in accordance with a difference of the back electromotive voltage and the midpoint voltage with respect to a predetermined timing set for each ON time-period; and a comparator which compares voltage values of the difference signal outputted from the difference signal generation circuit and the ramp signal outputted from the ramp signal generation circuit, to detect a zero-cross point.

Here, the back electromotive voltage at a certain timing tsh set for each ON time-period is expressed as Vu(tsh), the midpoint voltage as Vcom(tsh), and the ramp signal is expressed as a time function, Sramp(t). At this time, virtual back electromotive voltage Vu' of a time-period from timing tsh to timing tsh of a subsequent ON time-period is expressed as $$Vu'(t)=Vu(tsh)+Sramp(t)$$

Comparing the virtual back electromotive voltage Vu'(t) with the midpoint voltage Vcom(tsh) can be considered equivalent to comparing a difference (Vu(tsh)−Vcom(tsh)) between the back electromotive voltage Vu(tsh) and the midpoint voltage Vcom(tsh) at a predetermined timing, with the ramp signal Sramp(t). Therefore, by comparing the difference signal of the back electromotive voltage Vu(tsh) and the midpoint voltage Vcom(tsh) with the ramp signal Sramp(t), it is possible to preferably detect the zero-cross point.

The difference signal generation circuit may include first and second sample-and-hold circuits which sample and hold the back electromotive voltage and the midpoint voltage respectively, for each predetermined timing, and may generate the difference signal according to difference of the back electromotive voltage and the midpoint voltage sampled and held by the first and the second sample-and-hold circuits.

By using the sample-and-hold circuits, values of the back electromotive voltage Vu(tsh) and the midpoint voltage Vcom(tsh) at timing tsh can be held across one period of the pulse signal.

The ramp signal generation circuit may include the first sample-and-hold circuit which samples and holds the back electromotive voltage during a certain ON time-period, and the second sample-and-hold circuit which samples and holds the back electromotive voltage in another ON time-period, and may set a slope of the ramp signal, based on a difference of output voltages of the first and the second sample-and-hold circuits.

By using the two sample-and-hold circuits, it is possible to obtain the back electromotive voltage for two different times, and it is possible to detect the slope of the back electromotive voltage.

The ramp signal generation circuit may further include an amplifier which amplifies the difference of the output voltages of the first and second sample-and-hold circuits, and a slope setting circuit which increases voltage value of the ramp signal at a constant slope, during a period of the pulse signal, so that output voltage of the amplifier is a peak voltage of the ramp signal.

In such cases, by changing the peak voltage of the ramp signal according to the difference of the output voltages of the first and the second sample-and-hold circuits, it is possible to change the slope of the ramp signal in accordance with the slope of the back electromotive voltage.

The slope setting circuit may include a counter circuit which is reset for each period of the pulse signal, to begin counting upwards, and a digital-analog converter which performs digital-analog conversion of an output signal of the counter circuit, and may have the output voltage of the amplifier as a reference voltage of the digital-analog converter.

The pulse signal generation circuit may include an oscillator which outputs a triangular waveform signal of a predetermined period, and a comparator which compares voltage values of each of the triangular waveform signal outputted from the oscillator and a signal that prescribes torque, and outputs the pulse signal. The ramp signal generation circuit may include an amplifier which amplifies difference of output voltages of the first and second sample-and-hold circuits, and a slope adjustment circuit which generates a ramp signal by adjusting slope of the triangular waveform signal outputted from the oscillator, using an output voltage of the amplifier.

The BEMF detection circuit may include two sample-and-hold circuits which sample and hold one voltage selected among the back electromotive voltage and the midpoint voltage that occur in each phase coil; a control circuit which prescribes a voltage that is to be sampled and held, to each of the two sample-and-hold circuits, in accordance with two modes, which are a slope setting mode and a zero-cross detection mode; a ramp signal generation circuit which generates a ramp signal having a period identical to the pulse signal and having a slope set in accordance with difference of the output voltages of the two sample-and-hold circuits in the slope setting mode; and a comparator which compares a voltage according to difference of the output voltages of the two sample-and-hold circuits in the zero-cross detection mode, and a voltage value of the ramp signal outputted from the ramp signal generation circuit, to detect a zero-cross point. The control circuit, in the slope setting mode, may prescribe, at a first timing during a certain ON time-period, sampling and holding of a back electromotive voltage occurring in a phase coil currently driving, to one of the sample-and-hold circuits, and may prescribe, at a second timing during another ON time-period, sampling and holding of the back electromotive voltage occurring in the phase coil currently driving, to the other of the sample-and-hold circuits; and, in the zero-cross detection mode, may prescribe, at a predetermined timing set for each ON time-period, sampling and holding of a back electromotive voltage occurring in the phase coil currently driving, to one of the sample-and-hold circuits, and sampling and holding of a midpoint voltage, to the other of the sample-and-hold circuits.

The motor drive circuit may be integrated as a unit on one semiconductor substrate. "Integrated" includes cases in which all component elements of the circuit are formed on the semiconductor substrate, and cases in which main component elements of the circuit are integrated, and some resistors, capacitors, or the like, for adjusting a circuit constant, may be arranged outside the semiconductor substrate.

Another embodiment of the present invention is a disk device. This device is provided with a spindle motor which rotates a disk, and the motor drive circuit described above which drives the spindle motor.

According to this embodiment, since it is possible to reduce time lag when detecting zero-cross, irregularities in rotation of the disk can be curtailed.

According to a further embodiment of the present invention, a motor drive method is provided which supplies a drive current in a pulse form to a multiphase motor, to drive the motor. This motor drive method includes the steps of: generating a pulse signal having a duty ratio in accordance with torque; alternately repeating an ON time-period and an OFF time-period in accordance with the pulse signal, to supply a drive current in a pulse form to a phase coil currently driving; interpolating back electromotive voltage of the OFF time-period, using a back electromotive voltage of the ON time-period, with respect to the back electromotive voltage occurring in at least one coil of the multiphase motor, to generate an interpolated virtual back electromotive voltage; detecting a zero-cross point, by comparing the interpolated virtual back electromotive voltage with a midpoint voltage of the coil, to generate a BEMF detection signal; and switching a phase to be driven, based on the BEMF detection signal.

In an embodiment, the motor drive method may further include the steps of: detecting a slope of a back electromotive voltage from the back electromotive voltage at a first timing during a certain ON time-period, and the back electromotive voltage at a second timing during another ON time-period; and interpolating a back electromotive voltage of an OFF time-period, using the detected slope.

In an embodiment, the motor drive method may further include the steps of: detecting slope of a back electromotive voltage from the back electromotive voltage at a first timing during a certain ON time-period, and the back electromotive voltage at a second timing during another ON time-period; generating a ramp signal of a sawtooth waveform, having a period identical to the pulse signal and having a slope in accordance with the slope of the detected back electromotive voltage; generating a difference signal in accordance with a difference of a back electromotive voltage and a midpoint voltage at a predetermined timing set for each ON time-period, and detecting a zero-cross point, by comparing voltage values of the difference signal and the ramp signal.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 2:
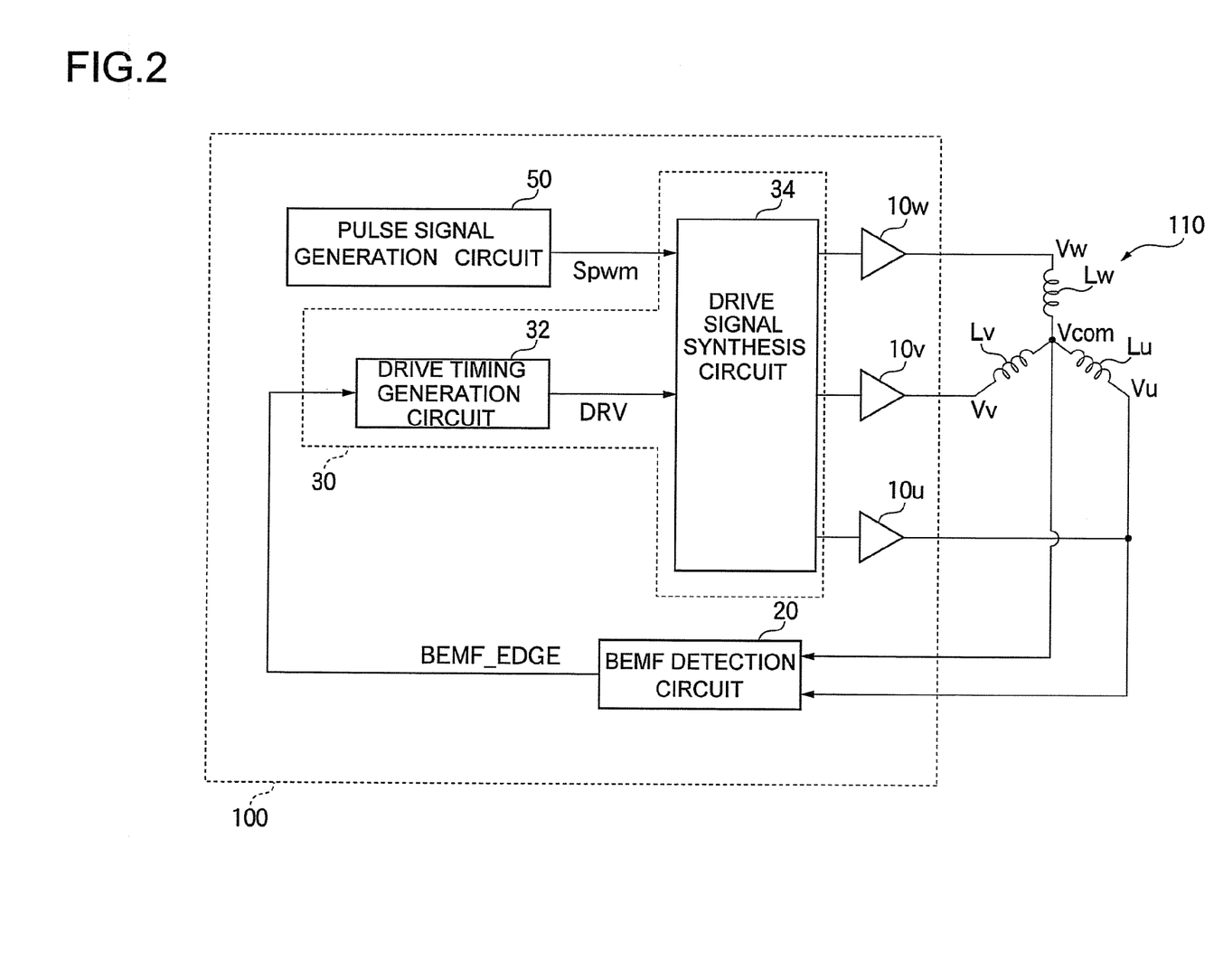
FIG. 2 is a block diagram showing a configuration of a motor drive circuit according to an embodiment.

FIG. 2 is a block diagram showing a configuration of a motor drive circuit 100 according to an embodiment. The motor drive circuit 100 supplies a drive current to a sensorless, brushless DC motor (simply referred to below as a motor 110), to control rotation. In the present embodiment, the motor 110, which is to be driven, is a three phase DC motor including coils Lu, Lv, and Lw, of phase U, phase V, and phase W.

The motor drive circuit 100 is provided with switching circuits $10u$, $10v$, and $10w$ (referred to collectively as switching circuits 10), a BEMF detection circuit 20, a switching control circuit 30, and a pulse signal generation circuit 50. The motor drive circuit 100 is integrated as a function IC on one semiconductor substrate. The motor drive circuit 100 drives, for example, by a PWM (Pulse Width Modulation) method supplying a drive current in a pulse form to the multiphase motor 110, so as to obtain a desired torque.

The switching circuits $10u$, $10v$, and $10w$ are provided for the respective coils Lu, Lv, and Lw of the motor 110. The switching circuits $10u$, $10v$, and $10w$ are configured to include a high side switch and a low side switch connected in series between a power supply voltage and ground potential, for example, and a connection point of the two switches is connected to a coil. Drive signals DRV_H (U, V, W), and drive signals DRV_L (U, V, W) are respectively inputted to a control terminal of the high side switch and the low side switch. The switching circuits $10u$, $10v$, and $10w$ apply, to an end of a connected coil, a high level voltage, in a state in which the high side switch is ON, and a low level voltage in a state in which the low side switch is ON. Furthermore, by the high side switch and the low side switch being OFF at the same time, a setting is made to a high impedance state. In FIG. 2, the drive signals DRV_H (U, V, W) and DRV_L (U, V, W) are shown simply as DRV. The switching circuit 10 alternately repeats an ON time-period Ton and an OFF time-period Toff to supply a drive current in a pulse format, to an end of a connected coil, according to a pulse signal Spwm from a pulse signal generation circuit 50, described later.

The BEMF detection circuit 20 compares back electromotive voltage (Vu, Vv, and Vw) occurring in at least one coil of the motor 110, with a midpoint voltage Vcom of the coil, to detect a zero-cross point, and to output a back detection signal BEMF_EDGE. In the present embodiment, an explanation is given of cases in which the BEMF detection circuit 20 monitors the midpoint voltage Vcom and the back electromotive voltage Vu, occurring in the coil Lu of phase U, and the back detection signal BEMF_EDGE is generated. The zero-cross point may be detected by a similar method for phase V and phase W also. The back detection signal BEMF_EDGE generated by the BEMF detection circuit 20 is outputted to the switching control circuit 30. Details of the BEMF detection circuit 20 are explained later.

The pulse signal generation circuit 50 generates a pulse width modulation signal (referred to below as a pulse signal Spwm) whose duty ratio changes according to at least a target torque of the motor 110. The pulse signal generation circuit 50 compares a periodic signal Sosc of a triangular waveform or a sawtooth waveform, and a level of a signal prescribing torque, and, in accordance with size relationship thereof, changes high level and low level time-period of the PWM signal Spwm. Furthermore, the pulse signal generation circuit 50 may be formed of either an analog circuit or a digital circuit. In order to gently change coil current flowing in the coils Lu, Lv, and Lw, the pulse signal generation circuit 50 may combine the target torque and a control waveform of a sine waveform or an arch form, to generate the PWM signal Spwm.

The switching control circuit 30 receives the PWM signal Spwm from the pulse signal generation circuit 50, and the back detection signal BEMF_EDGE from the BEMF detection circuit 20. The switching control circuit 30 controls a drive sequence of ON-OFF states of the plurality of switching circuits 10u, 10v, and 10w, based on the back detection signal BEMF_EDGE. In addition, the switching control circuit 30 performs switching control of at least one of a high side switch and a low side switch included in the plurality of switching circuits 10u, 10v, and 10w, based on the PWM signal Spwm.

The switching control circuit 30 includes a drive timing generation circuit 32 and a drive signal synthesis circuit 34. The back detection signal BEMF_EDGE is inputted to the drive timing generation circuit 32. The drive timing generation circuit 32 generates a drive signal DRV that prescribes a drive sequence, based on the back detection signal BEMF_EDGE. The drive signal synthesis circuit 34 combines the drive signal DRV and the PWM signal Spwm, outputs DRV_H (u, v, w) and DRV_L (u, v, w), and controls states of the switching circuits 10u, 10v, and 10w.

Next, a detailed explanation is given concerning the BEMF detection circuit 20. The back electromotive voltage Vu and the midpoint voltage Vcom are inputted to the BEMF detection circuit 20 according to the present embodiment. The BEMF detection circuit 20 uses at least the back electromotive voltage of the ON period Ton, to interpolate the back electromotive voltage of the OFF time-period Toff, and detects the zero-cross point, based on a voltage according to an interpolated virtual back electromotive voltage Vu' and a midpoint voltage Vcom of a coil.

Figure 3:
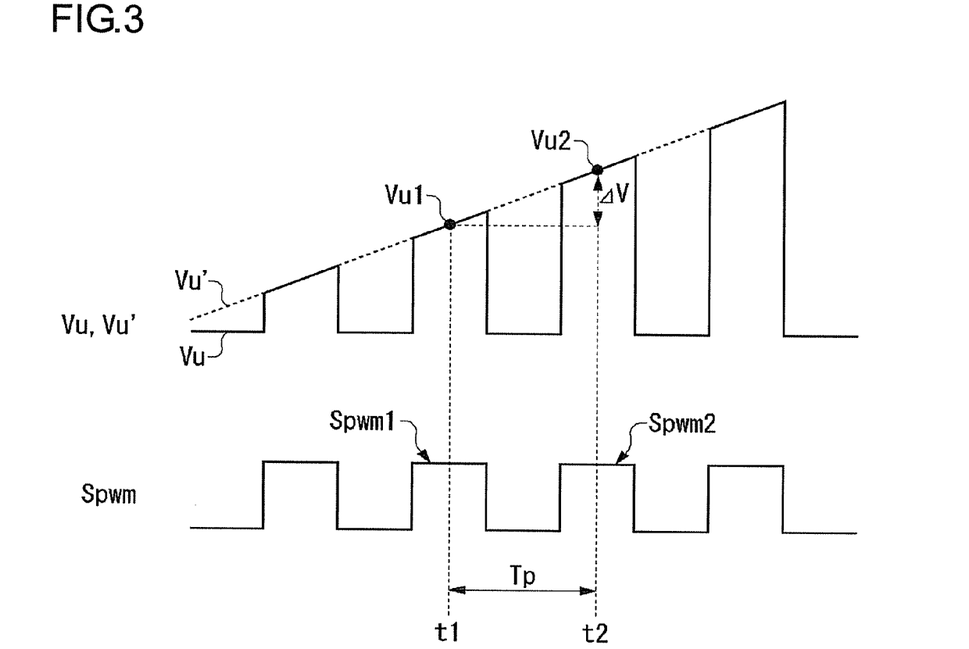
FIG. 3 shows a function of a BEMF detection circuit.

FIG. 3 shows a function of the BEMF detection circuit 20. In FIG. 3, the actual back electromotive voltage Vu is shown by a solid line, and the virtual back electromotive voltage Vu' is shown by a broken line. By using the virtual back electromotive voltage Vu' and the midpoint voltage Vcom, it is possible to detect the zero-cross point in the OFF time-period Toff.

The BEMF detection circuit 20 may detect a slope $\alpha$ of the back electromotive voltage Vu, from a back electromotive voltage Vu1 at a first timing t1 during the ON time-period Ton corresponding to a certain pulse signal Spwm1, and a back electromotive voltage Vu2 at a second timing t2 during the ON time-period Ton corresponding to another pulse signal Spwm2, and, using the detected slope $\alpha$, may interpolate the back electromotive voltage Vu of the OFF time-period Toff. As shown in the same figure, since the slope of the back electromotive voltage Vu maintains an almost constant value, by using the back electromotive voltage Vu of the ON time-period Ton, it is possible to interpolate the OFF time-period Toff. The pulse signals Spwm1 and Spwm2 may be adjacent pulses, as in FIG. 3, but may also be pulses at separated positions. Since an interval between the first timing t1 and the second timing t2 has a constant value and is an integral multiple of period Tp of the pulse signal Spwm, a difference voltage $\Delta V$ of the voltages Vu2 and Vu1 indicates the slope $\alpha$ of the back electromotive voltage Vu.

The BEMF detection circuit 20 may perform processing as follows.

(1) Detection of a slope $\alpha$ of the back electromotive voltage Vu, from the back electromotive voltage Vu1 at the first timing t1 during the ON time-period corresponding to a certain pulse signal, and the back electromotive voltage Vu2 at the second timing t2 during the ON time-period corresponding to another pulse signal.

(2) Generation of a ramp signal Sramp of a sawtooth waveform, having a period Tp the same as the pulse signal Spwm, and having a slope $\alpha'$ according to the detected slope $\alpha$ of the back electromotive voltage Vu.

(3) Generation of a difference signal Sdiff according to a difference of the back electromotive voltage Vu and the midpoint voltage Vcom, with respect to a predetermined timing tsh, set for each ON time-period.

(4) Comparison of voltage values of the difference signal Sdiff and the ramp signal Sramp, and detection of the zero-cross point.

Figure 4:
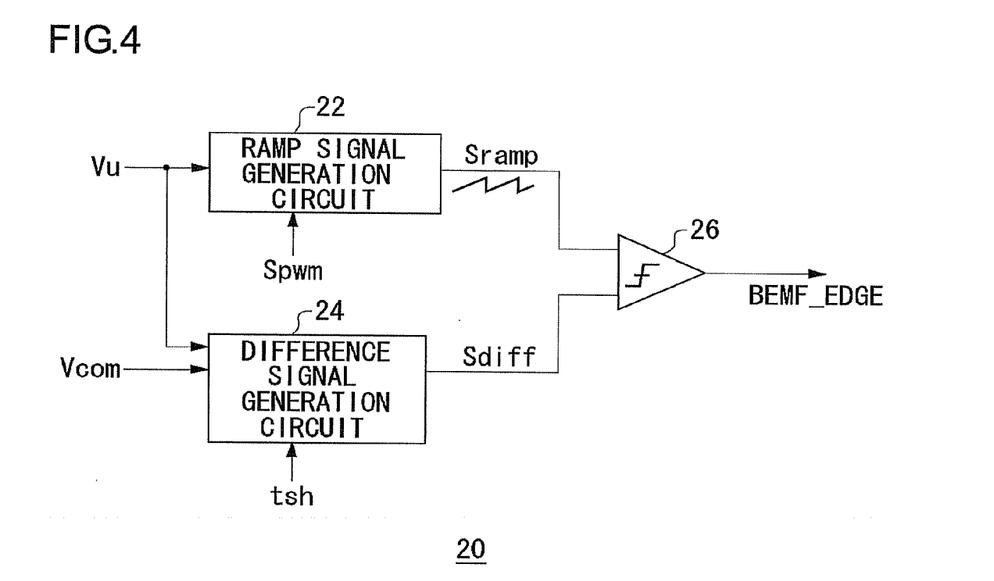
FIG. 4 is a block diagram showing a configuration of the BEMF detection circuit according to the embodiment.

FIG. 4 is a block diagram showing a configuration of the BEMF detection circuit 20 according to the embodiment. The BEMF detection circuit 20 is provided with a ramp signal generation circuit 22, a difference signal generation circuit 24, and a comparator 26. The ramp signal generation circuit 22 is a block which executes the abovementioned processing (1) and (2), the difference signal generation circuit 24 is a block which executes the abovementioned processing (3), and the comparator 26 is a block which executes the abovementioned processing (4).

That is, the ramp signal generation circuit 22 detects the slope $\alpha$ of the back electromotive voltage Vu, from the back electromotive voltage Vu1 at the first timing t1 during the ON time-period Ton corresponding to a certain pulse signal Spwm1, and the back electromotive voltage Vu2 at the second timing t2 during the ON time-period Ton corresponding to another pulse signal Spwm2. Furthermore, the ramp signal generation circuit 22 generates the ramp signal Sramp of a sawtooth waveform, having the period Tp the same as the pulse signal Spwm, and having the slope $\alpha'$ according to the detected slope $\alpha$ of the back electromotive voltage Vu. The slope $\alpha$ of the back electromotive voltage Vu, after driving a certain phase, has a tendency to have the same value also for cases in which it drives the same phase next. Therefore, the slope $\alpha'$ of the ramp signal Sramp, if once set, need not be re-set over a long time-period.

The difference signal generation circuit 24 generates the difference signal Sdiff according to the difference (Vu−Vcom) of the back electromotive voltage Vu and the midpoint voltage Vcom at the predetermined timing tsh, set for each of the ON time-periods Ton.

The comparator 26 compares voltage values of the difference signal Sdiff outputted from the difference signal generation circuit 24, and the ramp signal Sramp outputted from the ramp signal generation circuit 22, and detects the zero-cross point. Output of the comparator 26 is outputted as the back detection signal BEMF_EDGE.

Figure 5:
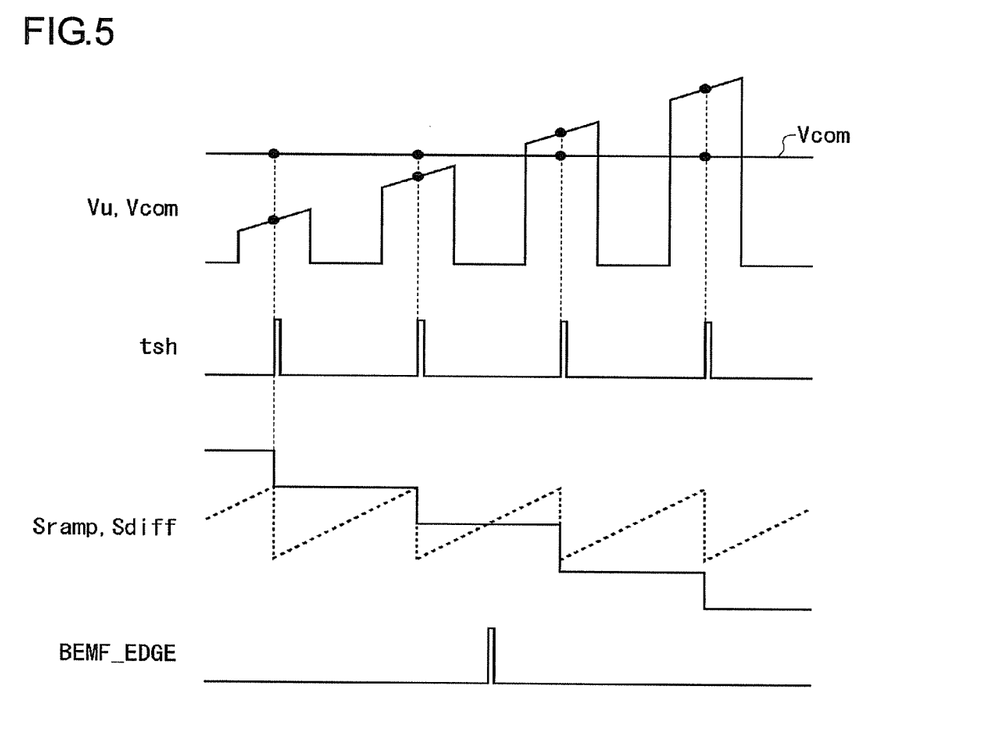
FIG. 5 is a time chart showing operation of the BEMF detection circuit of FIG. 4.

FIG. 5 is a time chart showing operation of the BEMF detection circuit 20 of FIG. 4. That is, FIG. 5 shows the abovementioned processing (1) to (4) implemented by the BEMF detection circuit 20. The predetermined timing tsh is set for each ON time-period of the pulse signal Spwm. At each predetermined timing tsh, the back electromotive voltage Vu and the midpoint voltage Vcom are sampled and held, and the difference signal Sdiff is generated. The slope $\alpha'$ of the ramp signal Sramp generated by the ramp signal generation circuit 22 is set according to the slope α of the back electromotive voltage Vu. When the ramp signal Sramp intersects with the difference signal Sdiff, the zero-cross point is detected by the comparator 26, and the back detection signal BEMF_EDGE goes to a predetermined level (for example, a high level).

Now, using the ramp signal Sramp(t), the virtual back electromotive voltage Vu'(t) can be expressed as $$Vu'(t)=Vu(tsh)+Sramp(t)$$

Comparing the virtual back electromotive voltage Vu'(t) with the midpoint voltage Vcom(tsh) can be considered equivalent to comparing the difference (Vu(tsh)−Vcom(tsh)) of the back electromotive voltage Vu(tsh) and the midpoint voltage Vcom (tsh) at the predetermined timing, with the ramp signal Sramp (t). Therefore, according to the BEMF detection circuit 20 of FIG. 4, by comparing the difference signal of the back electromotive voltage Vu(tsh) and the midpoint Vcom(tsh), with the ramp signal Sramp(t), it is possible to detect the zero-cross point.

According to the motor drive circuit 100 according to the present embodiment, since the back electromotive voltage Vu during the OFF time-period Toff is interpolated, and compared with the midpoint voltage Vcom, the zero-cross point occurring in the OFF time-period Toff can be preferably detected. As a result, the time lag occurring in conventional circuits can be curtailed, and it is possible to reduce rotational irregularities of the motor 110.

Furthermore, according to the motor drive circuit 100 according to the present embodiment, since the value of the back electromotive voltage Vu at the timing tsh in the ON time-period is interpolated to perform detection of the zero-cross point, it is possible to exclude back noise effects. As a result, it is possible to stably detect the zero-cross point, without performing mask processing as is carried out with conventional circuits.

Below, a more specific circuit configuration is explained.

Figure 6:
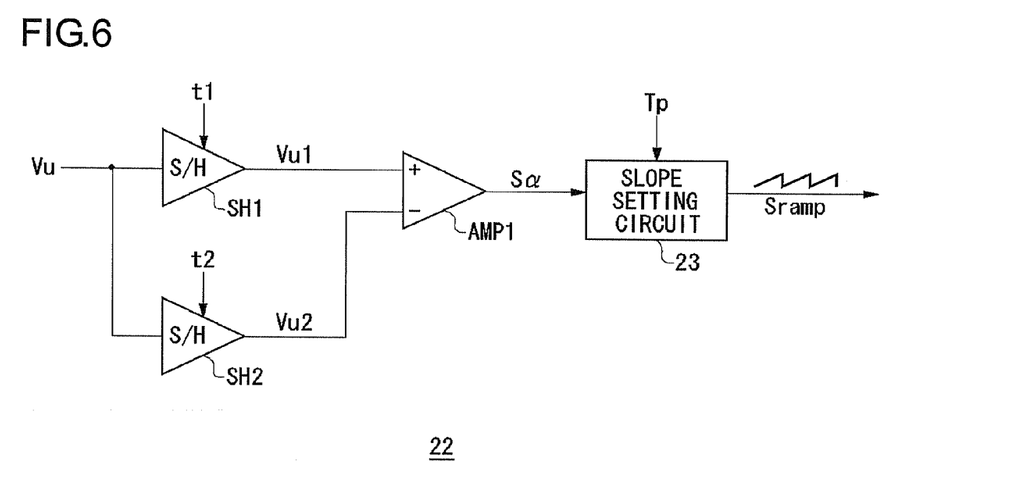
FIG. 6 is a circuit diagram showing a configuration example of a ramp signal generation circuit.

FIG. 6 is a circuit diagram showing a configuration example of a ramp signal generation circuit 22. The ramp signal generation circuit 22 includes sample-and-hold circuits SH1 and SH2, an amplifier AMP1, and a slope setting circuit 23.

The sample-and-hold circuit SH1 samples and holds the back electromotive voltage Vu, at the first timing t1 during the ON time-period, corresponding to a certain pulse signal Spwm1. The sample-and-hold circuit SH2 samples and holds the back electromotive voltage Vu, at the second timing t2 during the ON time-period, corresponding to another pulse signal Spwm2. The amplifier AMP1 amplifies a difference of the output voltages Vu1 and Vu2 of the sample-and-hold circuits SH1 and SH2. An output signal Sα of the amplifier AMP1 changes in accordance with the slope α of the back signal. The slope setting circuit 23 increases voltage value of the ramp signal Sramp, during the period Tp of the pulse signal Spwm, so that the output voltage Sα of the amplifier AMP1 becomes a peak voltage of the ramp signal Sramp. In this way, the ramp signal generation circuit 22 sets the slope of the ramp signal Sramp, based on a difference of the output voltages Vu1 and Vu2 of the sample-and-hold circuits SH1 and SH2.

Figure 7:
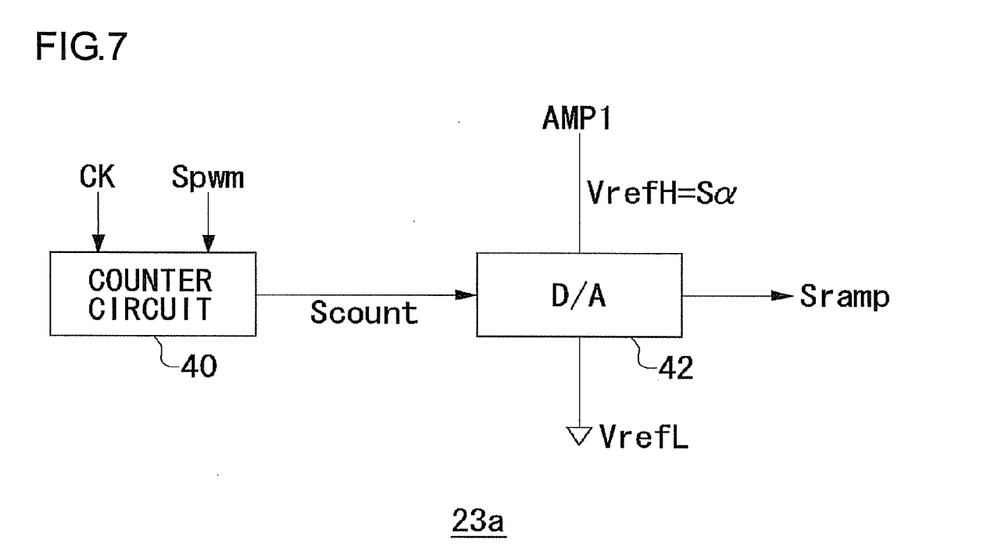
FIG. 7 is a block diagram showing a first configuration example of a slope setting circuit of FIG. 6.

FIG. 7 is a block diagram showing a first configuration example of the slope setting circuit 23 of FIG. 5. The slope setting circuit 23a includes a counter circuit 40 and a D/A converter 42.

The counter circuit 40 is a digital counter which counts upward according to a clock signal CK. Frequency of the clock signal CK is set sufficiently higher than frequency of the pulse signal Spwm. The counter circuit 40 is re-set for each period Tp of the pulse signal Spwm. The D/A converter 42 performs digital-analog conversion of an output signal of the counter circuit 40. The D/A converter 42 performs digital-analog conversion based on an upper reference voltage VrefH and a lower reference voltage VrefL. In the slope setting circuit 23a of FIG. 7, the output voltage Sα of the amplifier AMP1 of FIG. 6 is inputted as the upper reference voltage VrefH.

Since the counter circuit 40 is re-set for each period of the pulse signal Spwm, a value of an output signal Scount of the counter circuit 40 has a ramp waveform having a period the same as the pulse signal Spwm. The peak voltage of the ramp signal Sramp is set by the D/A converter 42, according to the output signal Sα of the amplifier AMP1. According to the slope setting circuit 23a of FIG. 7, the slope of the ramp signal Sramp is set according to the difference of the two back electromotive voltages Vu1 and Vu2.

Figure 8:
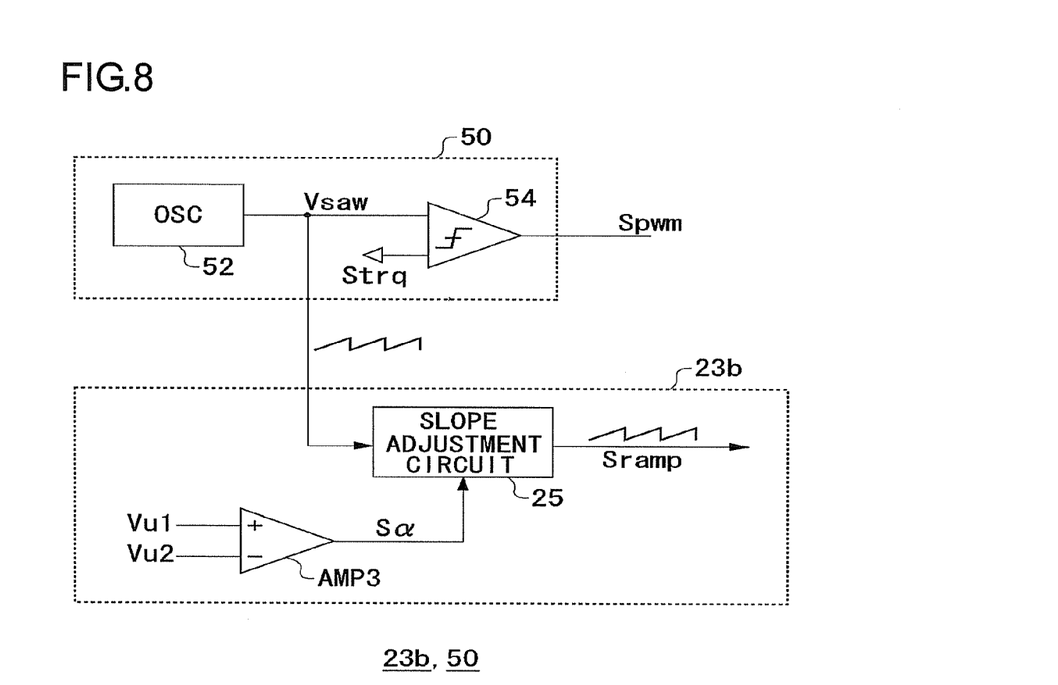
FIG. 8 is a block diagram showing a second configuration example of a pulse signal generation circuit of FIG. 2 and the slope setting circuit of FIG. 6.

FIG. 8 is a block diagram showing a second configuration example of the pulse signal generation circuit 50 of FIG. 2 and the slope setting circuit 23 of FIG. 6. A pulse signal generation circuit 50 includes an oscillator 52 which outputs a triangular waveform signal of a predetermined cycle, and a comparator 54 which compares voltage values of each of the triangular waveform signal Vsaw outputted from the oscillator 52 and a signal Strq that prescribes torque, and outputs a pulse signal Spwm.

A slope setting circuit 23b includes an amplifier AMP3 and a slope adjustment circuit 25. The amplifier AMP3 amplifies the difference of the output voltages Vu1 and Vu2 of the sample-and-hold circuits SH1 and SH2 of FIG. 6. The amplifier AMP3 corresponds to the amplifier AMP1 of FIG. 6. By adjusting the slope of the triangular waveform signal Vsaw outputted from the oscillator 52, using the output voltage Sα of the amplifier AMP3, the slope adjustment circuit 25 generates the ramp signal Sramp. It is possible to set the slope of the ramp signal Sramp according to the two back electromotive voltages Vu1 and Vu2, also by a circuit of FIG. 8.

A third configuration example of the slope setting circuit 23 is a time constant circuit that charges a capacitor by a constant current. In such cases, the constant current value is set according to the output signal Sa of the amplifier AMP3, and the capacitor is charged by this constant current. By re-setting charge stored in the capacitor every period Tp, it is possible to generate a ramp signal Sramp. Various variations can be envisaged for configurations of the slope setting circuit 23, outside of the first to the third configuration examples, and such variations are clearly included in the scope of the present invention.

Figure 9:
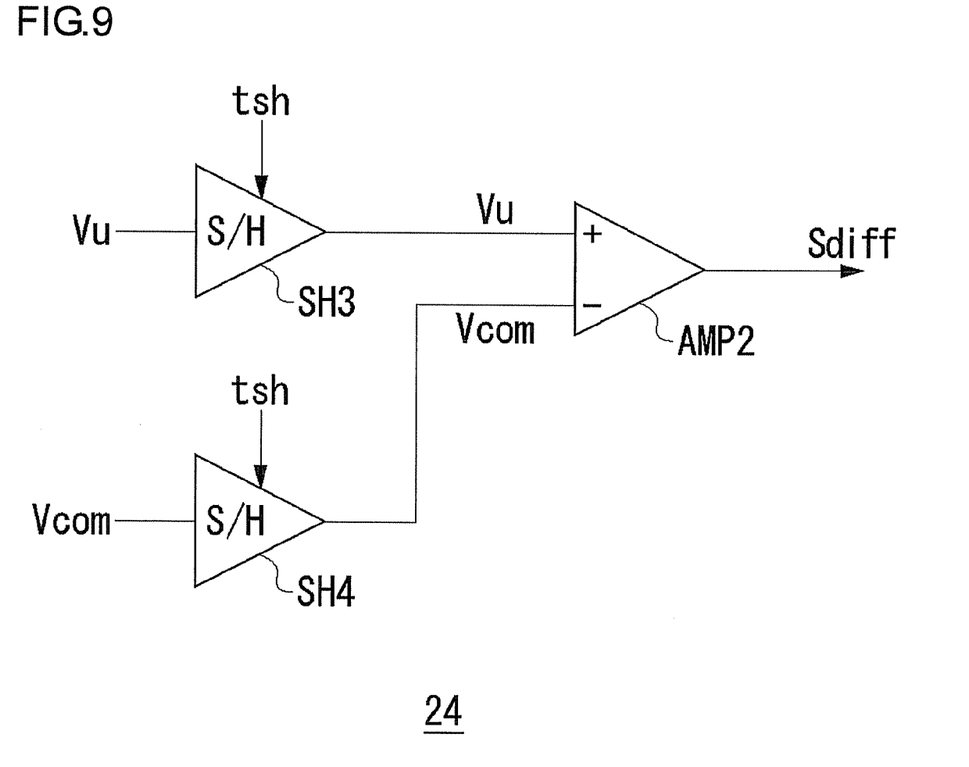
FIG. 9 is a circuit diagram showing a configuration example of a difference signal generation circuit.

FIG. 9 is a circuit diagram showing a configuration example of a difference signal generation circuit 24. The difference signal generation circuit 24 includes sample-and-hold circuits SH3 and SH4, and an amplifier AMP2. The sample-and-hold circuits SH3 and SH4 respectively sample and hold the back electromotive voltage Vu and the midpoint voltage Vcom, for every predetermined timing tsh. The amplifier AMP2 may amplify the difference (Vu−Vcom) of the back electromotive voltage Vu and the midpoint voltage Vcom, sampled and held by the sample-and-hold circuits SH3 and SH4, and output a signal according to the difference, as the difference signal Sdiff.

Figure 10:
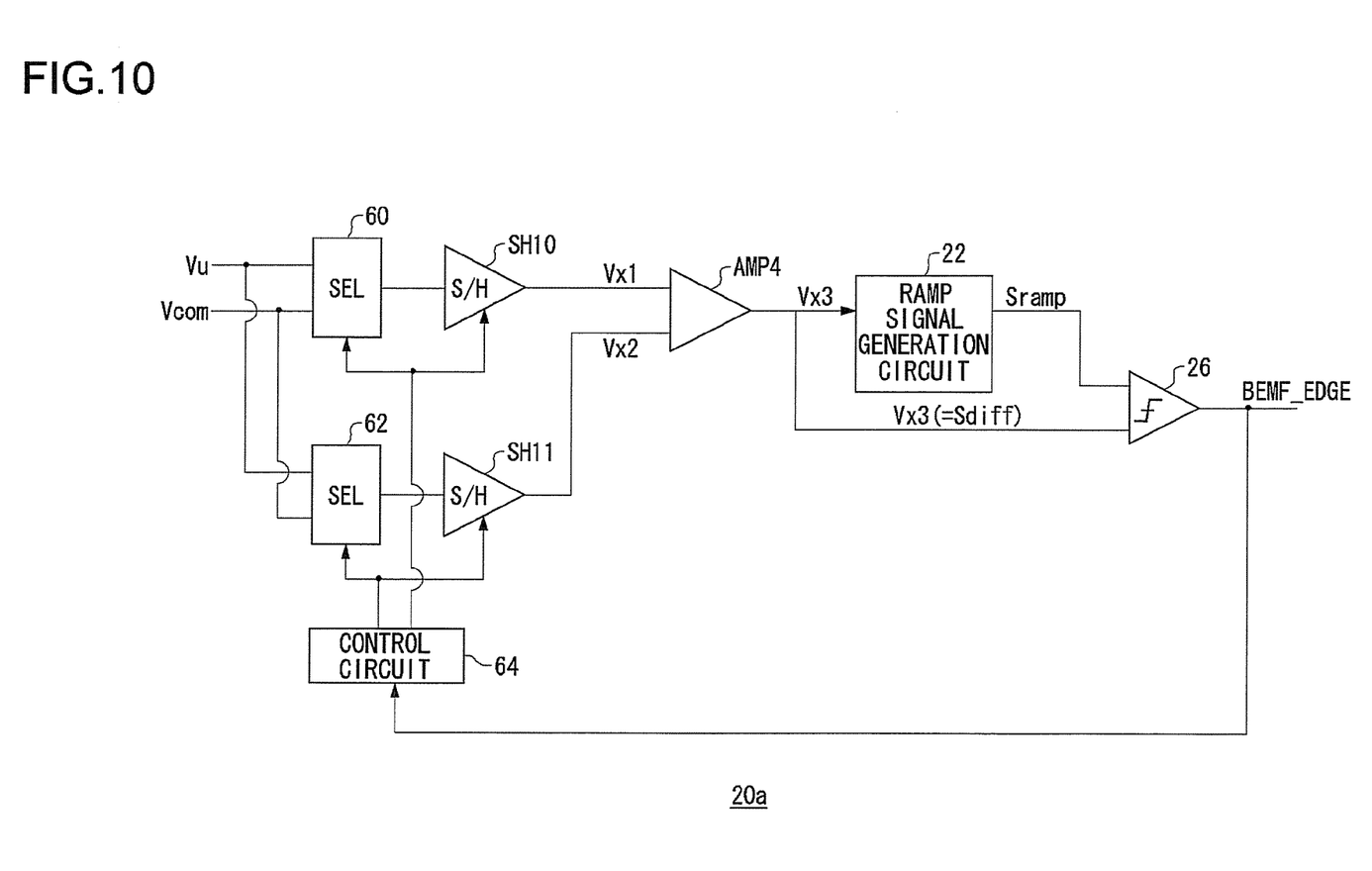
FIG. 10 is a block diagram showing a preferable configuration example of the BEMF detection circuit.

FIG. 10 is a block diagram showing a preferable configuration example of the BEMF detection circuit 20. The BEMF detection circuit 20a of FIG. 10 operates in two modes, a slope setting mode and a zero-cross detection mode. In the slope setting mode, processing is performed to detect the slope α of the back electromotive voltage Vu, in order to generate the ramp signal Sramp. In the zero-cross detection mode, detection of the zero-cross point is carried out, based on the ramp signal Sramp and the difference signal Sdiff.

The BEMF detection circuit 20a includes sample-and-hold circuits SH10 and SH11, selector circuits 60 and 62, a control circuit 64, a ramp signal generation circuit 22, an amplifier AMP4, and a comparator 26.

The back electromotive voltage Vu and the midpoint voltage Vcom generated in coils are inputted to the selector circuits 60 and 62. Although not shown in FIG. 10, back electromotive voltages Vv and Vw of phase V and phase W may be inputted to the selector circuits 60 and 62. In accordance with an instruction of the control circuit 64, the selector circuits 60 and 62 select one inputted voltage, to be outputted to the sample-and-hold circuits SH10 and SH11. The sample-and-hold circuits SH10 and SH11 sample and hold voltages selected by the selector circuits 60 and 62. The amplifier AMP4 amplifies a difference (Vx1−Vx2) of output voltages Vx1 and Vx2 of the sample-and-hold circuits SH10 and SH11.

The control circuit 64 controls the selector circuits 60 and 62, in accordance with the two modes, the slope setting mode and the zero-cross detection mode, and switches voltages that are to be sampled and held respectively by the two sample-and-hold circuits SH10 and SH11.

Specifically, the control circuit 64, in the slope setting mode, prescribes sampling and holding of the back electromotive voltage Vu occurring in a phase coil during current driving, to one of the sample-and-hold circuits SH10, at a first timing t1 during an ON time-period with respect to a certain pulse signal, and prescribes sampling and holding of the back electromotive voltage Vu occurring in a phase coil during current driving, to the other of the sample-and-hold circuits SH11, at a second timing t2 during the ON time-period with respect to another pulse signal.

In the slope setting mode, the sample-and-hold circuits SH10 and SH11 and the amplifier AMP4 of FIG. 10 respectively fulfill functions equivalent to the sample-and-hold circuits SH1 and SH2 and the amplifier AMP1 of FIG. 6, and voltages are Vx1=Vu1, and Vx2=Vu2. The ramp signal generation circuit 22 generates the ramp signal Sramp that has a period the same as the pulse signal Spwm, and has a slope set according to a difference of the output voltages Vx1 and Vx2 of the two sample-and-hold circuits SH10 and SH11 in the slope setting mode.

Furthermore, the control circuit 64, in the zero-cross detection mode, at a predetermined timing tsh, set for each ON time-period, prescribes sampling and holding the back electromotive voltage Vu that occurs in a phase coil during current driving, in one of the sample-and-hold circuits SH10, and sampling and holding of the midpoint voltage Vcom in the other of the sample-and-hold circuits SH11.

In the zero-cross detection mode, the sample-and-hold circuits SH10 and SH11 and the amplifier AMP4 of FIG. 10 respectively fulfill functions equivalent to the sample-and-hold circuits SH3 and SH4 and the amplifier AMP2 of FIG. 9, and voltages are Vx1=Vu, and Vx2=Vcom. Therefore, in the zero-cross detection mode, output voltage Vx3 of the amplifier AMP4 and the difference signal Sdiff are equivalent.

The comparator 26 compares output voltage Vx4 of the amplifier AMP4 in the zero-cross detection mode, with a voltage value of the ramp signal Sramp outputted from the ramp signal generation circuit 22, to detect the zero-cross point.

Figure 11:
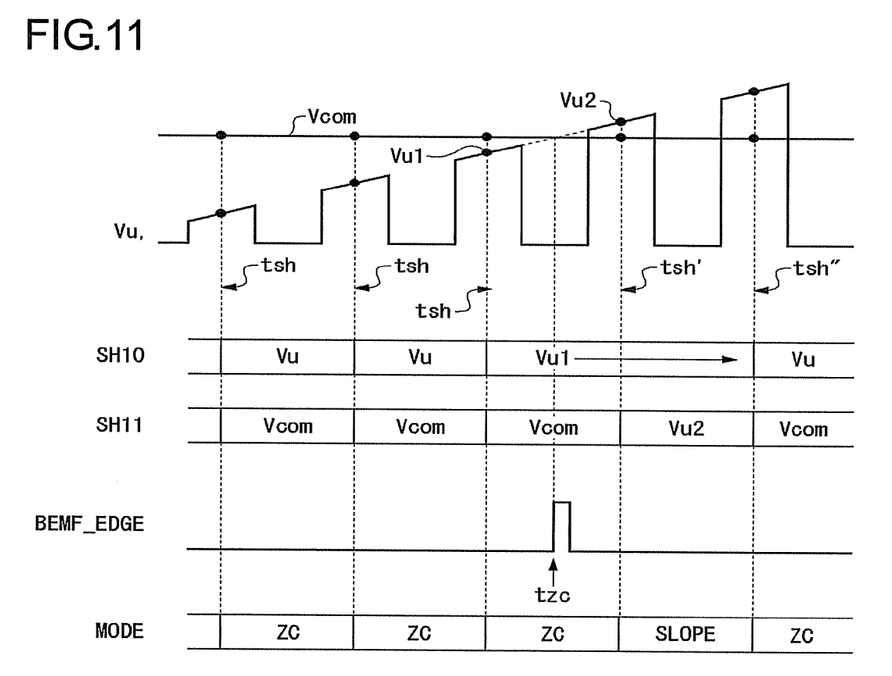
FIG. 11 is an operation time chart of the BEMF detection circuit of FIG. 10.

FIG. 11 is an operation time chart of the BEMF detection circuit 20 of FIG. 10. The zero-cross detection mode is shown as ZC, and the slope setting mode is shown as SLOPE. In the zero-cross detection mode ZC, the sample-and-hold circuits SH10 and SH11 respectively sample and hold the back electromotive voltage Vu and the midpoint Vcom, for each predetermined timing tsh.

At time tzc, when the zero-cross point is detected, the control circuit 64, at the next timing tsh', continues to hold the back electromotive voltage Vu of the previous time, without a sample-and-hold operation of the sample-and-hold circuit SH10 being performed. Moreover, at the timing tsh', the midpoint voltage Vcom is sampled and held in the sample-and-hold circuit SH11. That is, in the time chart of FIG. 11, a time-period from the timing tsh' just after the zero-cross point has been detected to the next timing tsh", is set to the slope setting mode SLOPE. In the time-period of the slope setting mode SLOPE, the slope α of the back electromotive voltage Vu is detected by the back electromotive voltage Vu1 and Vu2, that are sampled and held by the sample-and-hold circuits SH10 and SH11. That is, the slope of the back electromotive voltage of the zero-cross point across time-periods is detected. The detected slope α is used in order to generate the ramp signal Sramp, when a phase U is next driven.

According to the BEMF detection circuit 20 of FIG. 10, the sample-and-hold circuit for detecting the slope α of the back electromotive voltage Vu, and the sample-and-hold circuit for generating a difference of the back electromotive voltage Vu and the midpoint voltage Vcom, can be shared, and it is possible to curtail circuit area. Furthermore, the amplifier which amplifies the difference of the output voltages of the sample-and-hold circuits can also be shared.

Figure 12:
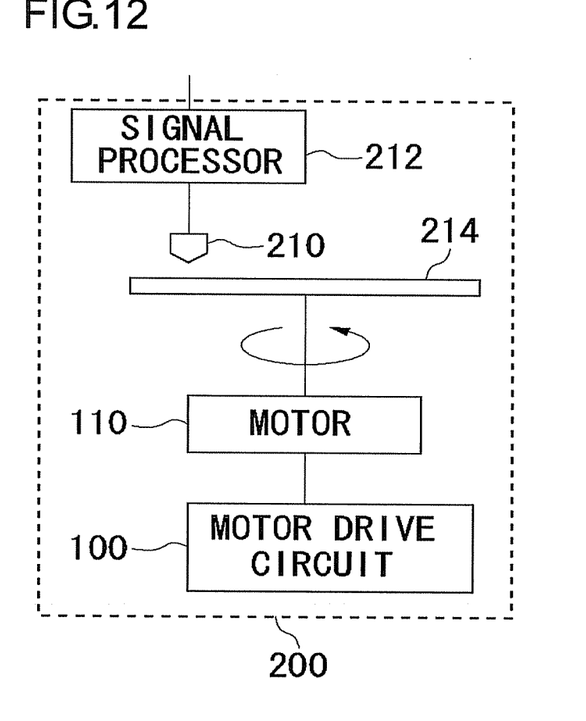
FIG. 12 is a block diagram showing a configuration of a disk device in which the motor drive circuit of FIG. 2 is installed.

Finally, an explanation is given of an application preferably using the motor drive circuit 100 according to the present embodiment. FIG. 12 is a block diagram showing a configuration of a disk device 200 in which the motor drive circuit 100 of FIG. 2 is installed. The disk device 200 is a unit which performs recording and reproduction processing of an optical disk such as a CD, DVD, or the like, and is installed in an electronic device such as a CD player, a DVD player, a personal computer, or the like. The disk device 200 includes a pickup unit 210, a signal processor 212, a disk 214, a motor 110 and a motor drive circuit 100.

The pickup unit 210 radiates a laser on the disk 214, to write desired data, or reads data written on the disk 214 by reading reflected light. The signal processor 212 performs amplification processing on data to be read or written by the pickup unit 210, and performs necessary signal processing such as A/D conversion, D/A conversion, or the like. The motor 110 is a spindle motor provided in order to rotate the disk 214. Since the disk device 200, such as shown in FIG. 12, is, in particular, required to be small, a sensorless type of motor, that does not use a Hall element, is used as the motor 110. The motor drive circuit 100 according to the present embodiment can be preferably used in order to stably drive this type of sensorless spindle motor.

The present invention has been explained above, based on the embodiments. The embodiments are examples; various modified examples in combinations of various component elements and various processes thereof are possible, and a person skilled in the art will understand that such modified examples are within the scope of the present invention.

In the embodiments, an explanation has been given concerning cases in which a three phase motor is driven, but the present embodiments can be preferably used also for driving sensorless motors that are not three phase types. For example, the invention may also be used for five phase motors.

Moreover, in the embodiments, an explanation has been given for cases in which the back electromotive voltage Vu of phase U is compared with the midpoint voltage Vcom to detect the zero-cross point, but the present invention is not limited thereto. For example, back electromotive voltages of phase U, phase V, and phase W, respectively, may be detected by the BEMF detection circuit 20, to generate the BEMF detection signal BEMF_EDGE.

Furthermore, in the embodiments, in a process in which a phase voltage Vu increases, the zero-cross point is detected by detecting a state in which Vu>Vcom, but the present invention is not limited thereto; in a process in which a phase voltage Vu decreases, the BEMF detection circuit 20 may detect the zero-cross point by detecting a state in which Vu<Vcom.

Setting of high level and low level logic signals explained in the embodiments is one example; various modified examples can be envisaged in configurations of logic circuit blocks, and such modified examples are included in the scope of the present invention.

While the preferred embodiments of the present invention_have been described using specific terms, such description is for illustrative purposes only, and it is to be understood that changes and variations may be made without departing from the spirit or scope of the appended claims.

What is claimed is:

1. A motor drive circuit which supplies a drive current in a pulse form to a multiphase motor, to drive the motor, the circuit comprising:
   a pulse signal generation circuit which generates a pulse signal having a duty ratio in accordance with torque;
   plural switching circuits which are provided for every coil of the multiphase motor, and which alternately repeat an ON time-period and an OFF time-period, to supply a drive current in a pulse form to an end of a connected coil, in accordance with the pulse signal from the pulse signal generation circuit;
   a back electromotive force detection circuit which compares a back electromotive voltage occurring in at least one coil of the multiphase motor, with a midpoint voltage of the coil, to detect a zero-cross point, and which outputs a back electromotive force detection signal; and
   a switching control circuit which controls drive sequence of the plural switching circuits, based on the back electromotive force detection signal from the back electromotive force detection circuit; wherein
   the back electromotive force detection circuit uses, at least, the back electromotive voltage of the ON time-period to interpolate the back electromotive voltage of the OFF time-period, and detects the zero-cross point, based on voltage in accordance with an interpolated virtual back electromotive voltage and the midpoint voltage of the coil.

2. A motor drive circuit according to claim 1, wherein the back electromotive force detection circuit detects a slope of a back electromotive voltage, from the back electromotive voltage at a first timing during a certain ON time-period, and the back electromotive voltage at a second timing during another ON time-period, and uses the detected slope to interpolate the back electromotive voltage of the OFF time-period.

3. A motor drive circuit according to claim 1, wherein the back electromotive force detection circuit comprises:
   a ramp signal generation circuit which detects the slope of a back electromotive voltage, from the back electromotive voltage at a first timing during a certain ON time-period, and the back electromotive voltage at a second timing during another ON time-period, and generates a ramp signal having a period identical to the pulse signal and having a sawtooth waveform that has a slope in accordance with the slope of the detected back electromotive voltage;
   a difference signal generation circuit which generates a difference signal in accordance with a difference of the back electromotive voltage and the midpoint voltage with respect to a predetermined timing set for each ON time-period; and
   a comparator which compares voltage values of the difference signal outputted from the difference signal generation circuit and the ramp signal outputted from the ramp signal generation circuit, to detect the zero-cross point.

4. A motor drive circuit according to claim 3, wherein the difference signal generation circuit comprises:
   first and second sample-and-hold circuits which sample and hold the back electromotive voltage and the midpoint voltage respectively, for each predetermined timing; and wherein
   the difference signal is generated according to a difference of the back electromotive voltage and the midpoint voltage sampled and held by the first and the second sample-and-hold circuits.

5. A motor drive circuit according to claim 3, wherein the ramp signal generation circuit comprises:
   a first sample-and-hold circuit which samples and holds a back electromotive voltage during a certain ON time-period, and
   a second sample-and-hold circuit which samples and holds a back electromotive voltage during another ON time-period; and wherein
   slope of the ramp signal is set, based on a difference of output voltages of the first and the second sample-and-hold circuits.

6. A motor drive circuit according to claim 5, wherein the ramp signal generation circuit further comprises:
   an amplifier which amplifies difference of output voltages of the first and second sample-and-hold circuits; and
   a slope setting circuit which increases voltage value of the ramp signal at a constant slope, during a period of the pulse signal, so that output voltage of the amplifier is a peak voltage of the ramp signal.

7. A motor drive circuit according to claim 6, wherein the slope setting circuit comprises:
   a counter circuit which is reset for each period of the pulse signal, to begin counting upwards; and
   a digital-analog converter which performs digital-analog conversion of an output signal of the counter circuit; and wherein
   the output voltage of the amplifier is taken as a reference voltage of the digital-analog converter.

8. A motor drive circuit according to claim 5, wherein the pulse signal generation circuit comprises:
   an oscillator which outputs a triangular waveform signal of a predetermined period; and
   a comparator which compares respective voltage values of the triangular waveform signal outputted from the oscillator and a signal prescribing torque, and outputs the pulse signal; and wherein the ramp signal generation circuit comprises:
   an amplifier which amplifies a difference of output voltages of the first and second sample-and-hold circuits; and
   a slope adjustment circuit which generates the ramp signal by adjusting a slope of the triangular waveform signal outputted from the oscillator, using an output voltage of the amplifier.

9. A motor drive circuit according to claim 1, wherein the back electromotive force detection circuit comprises:
- two sample-and-hold circuits which sample and hold one voltage selected among the back electromotive voltage and the midpoint voltage that occur in each coil;
- a control circuit which prescribes a voltage that is to be sampled and held, to each of the two sample-and-hold circuits, in accordance with two modes, which are a slope setting mode and a zero-cross detection mode;
- a ramp signal generation circuit which generates a ramp signal having a period identical to the pulse signal and having a slope set in accordance with a difference of the output voltages of the two sample-and-hold circuits in the slope setting mode; and
- a comparator which compares a voltage according to a difference of the output voltages of the two sample-and-hold circuits in the zero-cross detection mode, and a voltage value of the ramp signal outputted from the ramp signal generation circuit, to detect a zero-cross point; and wherein the control circuit
- in the slope setting mode, prescribes, at a first timing during a certain ON time-period, sampling and holding of a back electromotive voltage occurring in a phase coil during current driving, to one of the sample-and-hold circuits, and prescribes, at a second timing during another ON time-period, sampling and holding of the back electromotive voltage occurring in the phase coil during current driving, to another of the sample-and-hold circuits, and,
- in the zero-cross detection mode, prescribes, at a predetermined timing set for each ON time-period, sampling and holding of the back electromotive voltage occurring in the phase coil currently driving, to one of the sample-and-hold circuits, and sampling and holding of the midpoint voltage, to another of the sample-and-hold circuits.

10. A motor drive circuit according to claim 1, wherein the motor drive circuit is integrated as a unit on one semiconductor substrate.

11. A disk device comprising:
- a spindle motor which rotates a disk; and
- the motor drive circuit according to claim 1 which drives the spindle motor.

12. A motor drive method which supplies a drive current in a pulse form to a multiphase motor, to drive the motor, the method comprising:
- generating a pulse signal having a duty ratio in accordance with torque;
- alternately repeating an ON time-period and an OFF time-period in accordance with the pulse signal, to supply a drive current in a pulse form to a phase coil currently driving;
- interpolating back electromotive voltage of the OFF time-period, using a back electromotive voltage of the ON time-period, with respect to the back electromotive voltage occurring in at least one coil of the multiphase motor, to generate an interpolated virtual back electromotive voltage;
- detecting a zero-cross point, by comparing the interpolated virtual back electromotive voltage with a midpoint voltage of the coil, to generate a back electromotive force detection signal; and
- switching a phase to be driven, based on the back electromotive force detection signal.

13. A motor drive method according to claim 12, further comprising:
- detecting a slope of a back electromotive voltage from the back electromotive voltage at a first timing during a certain ON time-period, and the back electromotive voltage at a second timing during another ON time-period; and
- interpolating a back electromotive voltage of the OFF time-period, using the detected slope.

14. A motor drive method according to claim 12, further comprising:
- detecting a slope of a back electromotive voltage from the back electromotive voltage at a first timing during a certain ON time-period, and the back electromotive voltage at a second timing during another ON time-period;
- generating a ramp signal of a sawtooth waveform, having a period identical to the pulse signal and having a slope in accordance with the slope of the detected back electromotive voltage;
- generating a difference signal in accordance with a difference of the back electromotive voltage and the midpoint voltage at a predetermined timing set for each ON time-period; and
- detecting a zero-cross point, by comparing voltage values of the difference signal and the ramp signal.

* * * * *